D. W. ADAMS.
ENGINEERING INSTRUMENT.
APPLICATION FILED SEPT. 29, 1911.
1,018,289.
Patented Feb. 20, 1912.
3 SHEETS—SHEET 1.
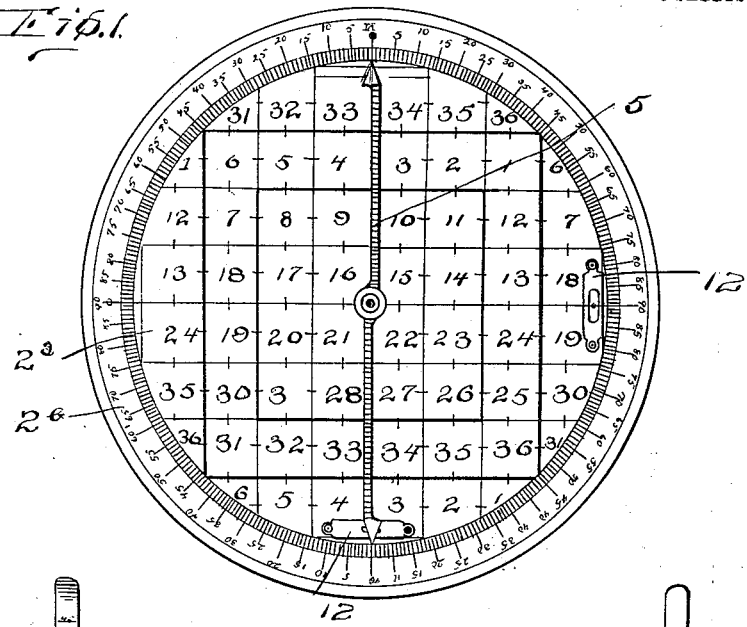
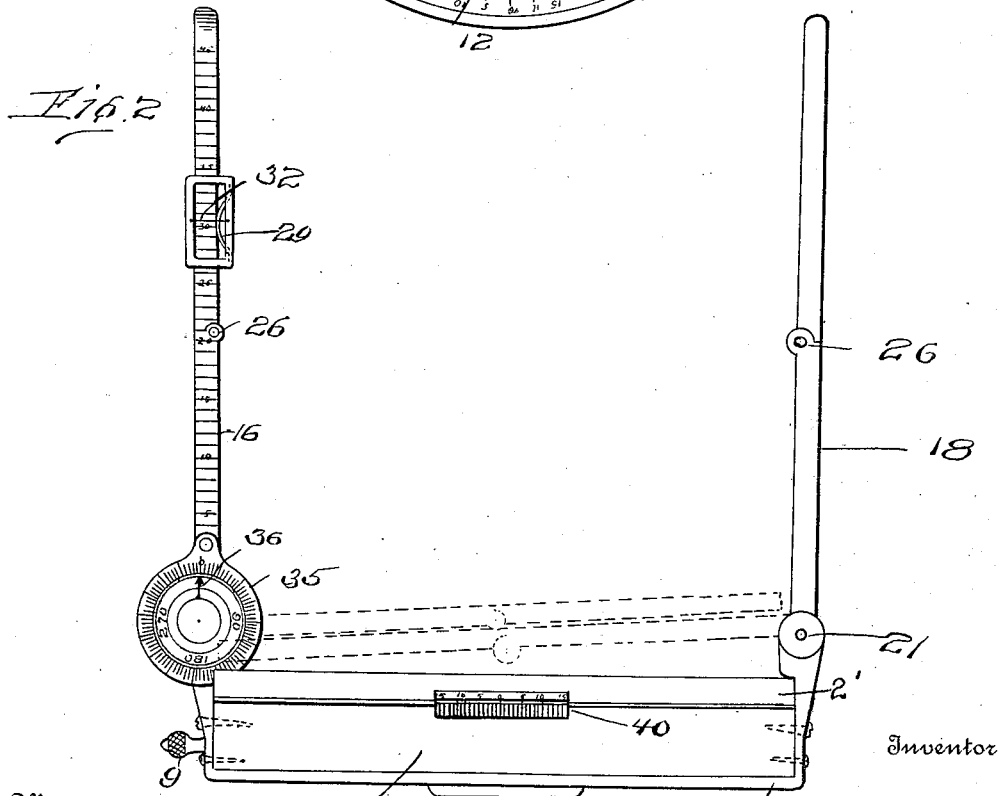

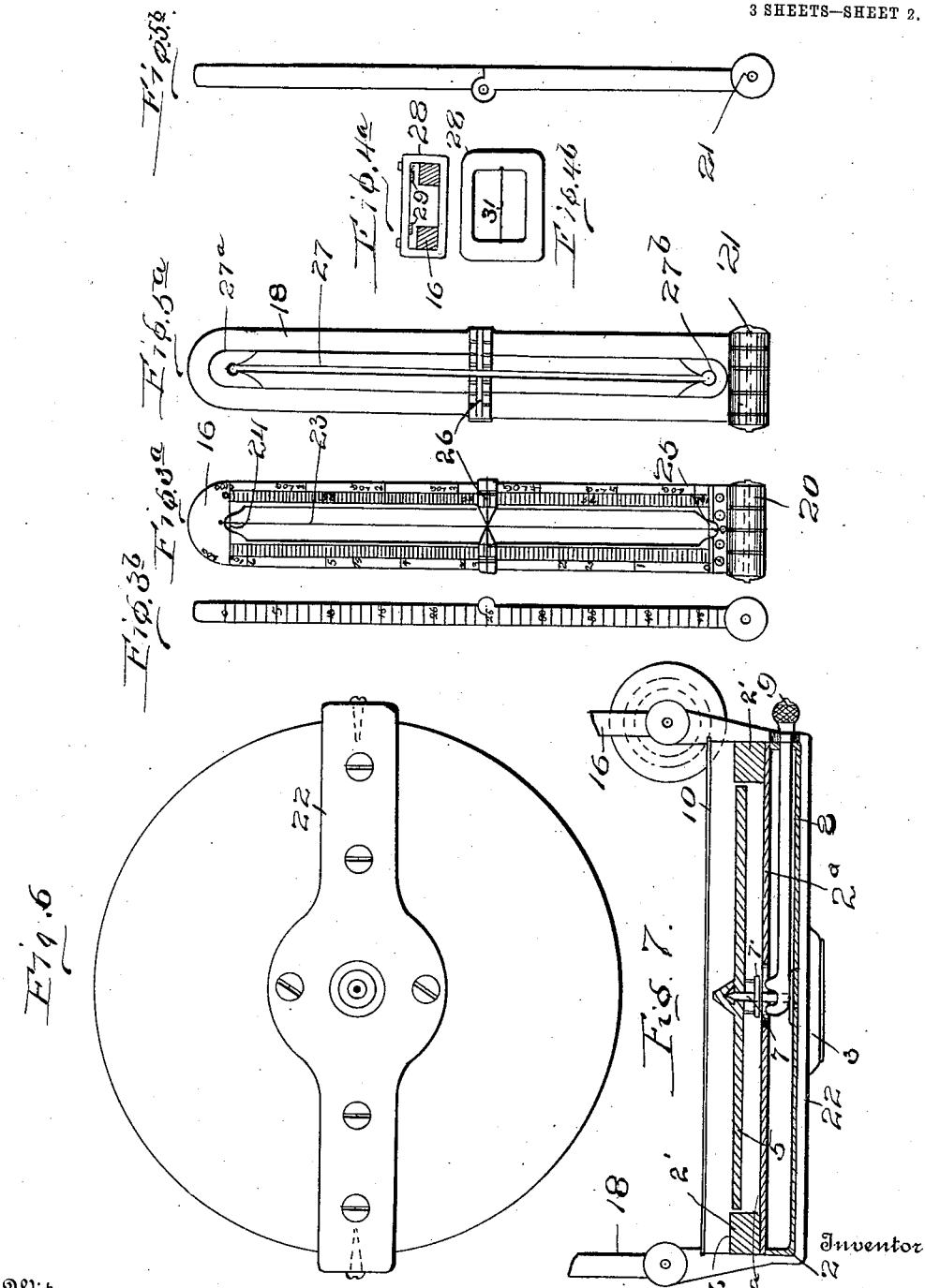

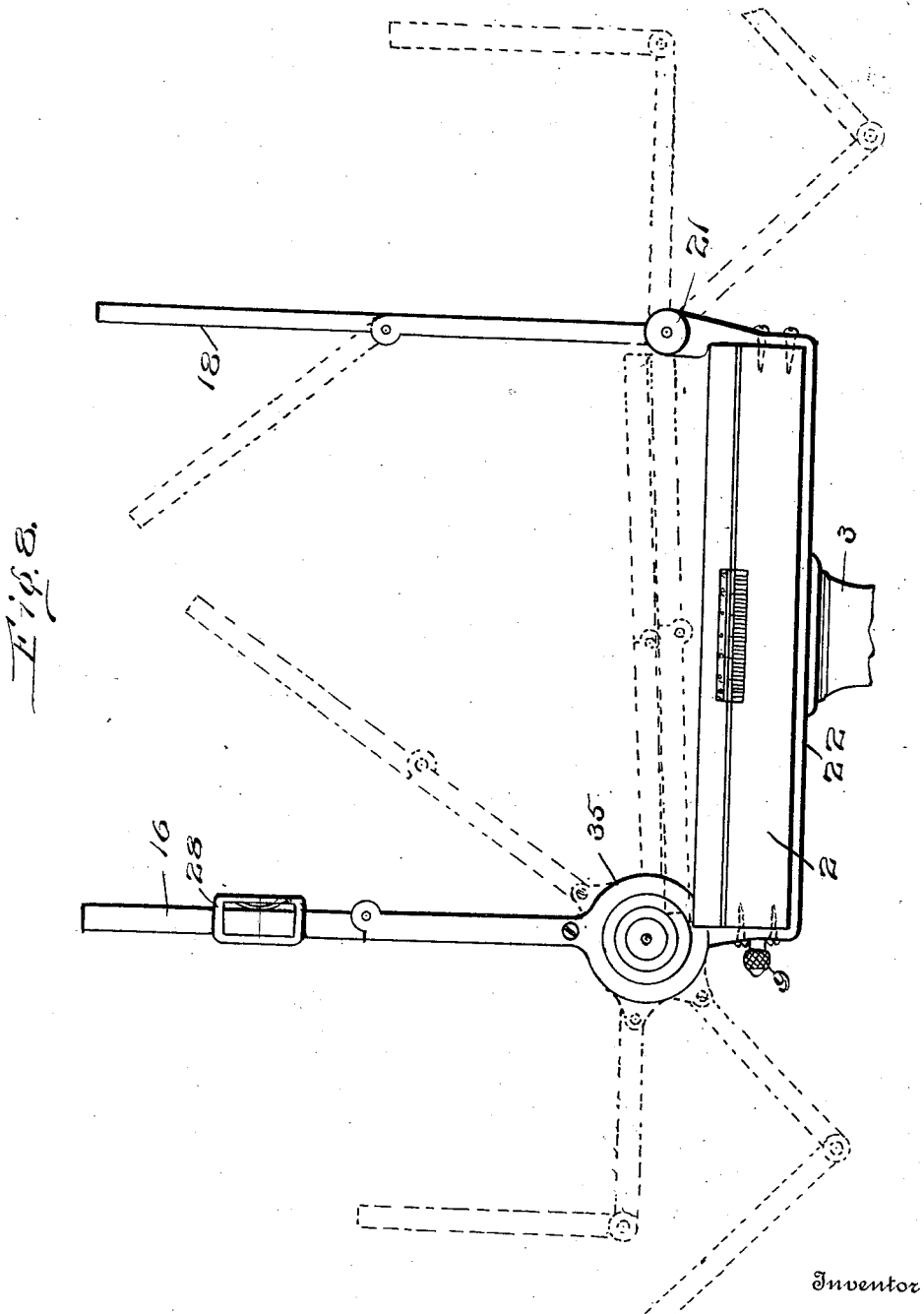

UNITED STATES PATENT OFFICE.

DANIEL W. ADAMS, OF GLENDALE SPRINGS, NORTH CAROLINA.

ENGINEERING INSTRUMENT.

1,018,289. Specification of Letters Patent. Patented Feb. 20, 1912.

Application filed September 29, 1911. Serial No. 651,920.

*To all whom it may concern:*

Be it known that I, DANIEL W. ADAMS, a citizen of the United States, residing at Glendale Springs, in the county of Ashe and State of North Carolina, have invented new and useful Improvements in Engineering Instruments, of which the following is a specification.

This invention relates to engineering instruments which are particularly useful to the surveyor or engineer in taking observations in rough mountainous country and in forestry work.

Ordinarily the surveyor or timber cruiser working in forest land is unable to determine bearings and distances with accuracy, and it is, therefore, necessary for him to follow along section lines, thereby losing a great deal of time.

One object of my invention is to provide an instrument which will enable the surveyor or cruiser to ascertain the course and distance of any section corner or quarter corner, from any other section corner or quarter corner in a township.

Another object is to enable trails and road lines to be laid out with great accuracy, say to within at least two tenths of one per cent. By means of my surveying instrument disclosed herein, the necessity for a hypsometer is obviated.

These and other objects which will appear will be understood from the following description in connection with the accompanying drawings, in which—

Figure 1 is a top plan view of an engineering instrument embodying my invention; Fig. 2 is a side elevation of the compass; Figs. 3$^a$ and 3$^b$ are front and side views, respectively, of the front sight; Figs. 4$^a$ and 4$^b$ are top plan and front views, respectively, of the sight-slide; Figs. 5$^a$ and 5$^b$ are front and side views, respectively, of the rear sight; Fig. 6 is a bottom plan view of the base and bottom supporting plate of the compass; Fig. 7 is a longitudinal vertical section of the compass; and Fig. 8 is a side elevation of the instrument, showing different positions of the sight arms in dotted lines.

The compass-box 2 may be secured to a head 3, which may be adjustably supported in the ordinary manner to a tripod or to a Jacob's staff. The compass needle 5 is pivotally mounted in the usual manner upon the point of a steel pin 7, a locking-lever 8, having a thumb-piece 9, being provided to bear against the disk 7', slidably mounted on the pin 7, to raise the needle into inoperative position against the glass cover 10. Bubble tubes 12, secured to the base plate, enable the instrument to be accurately leveled.

An important feature of my invention resides in the means for enabling the surveyor to determine the course and distance from one point to another. By referring to the top plan view shown in Fig. 1, it will be seen that I place upon the top surface 2$^a$ of the base-plate a diagram comprising a square inscribed within the degree-circle which is graduated upon the surface 2$^b$ of the ring 2', which rests upon the base 2, of the compass box. The square represents a township and is divided by intersecting lines into thirty-six squares, representing sections one mile square, and each side of which is bisected by a short cross-line to indicate the quarter-corners. The bordering sections of the adjoining townships are also indicated. Within the outer square is a smaller square, indicated by heavy lines, which may represent a section divided into forties, or a forty divided into two and one-half acre subdivisions.

It will be observed that I construct the needle with the opposite halves offset upon opposite sides of an axial line passing through the needle points, so that, as illustrated, the left upper side and the lower right side will coincide with said axial line passing through the pivot and opposite points. By this construction the axial edge of the needle will accurately bisect the sections at the corners and quarter corners as it swings over the plate. By offsetting the needle portions upon opposite sides of the axis, the needle is maintained in balance, and this might be assisted by extending the arrow-heads or points upon both sides of the axis as shown. The upper surface of the needle is graduated to indicate miles, and these being subdivided into tenths.

It will be apparent to engineers that by means of this arrangement the course and distance of any section corner, or quarter-corner, may be ascertained from any other section-corner or quarter-corner in the township. For example, if the surveyor or cruiser desires to know the course and distance from the SW. corner of section 7 to the quarter-corner of the north side of section 5, it is obvious that it is only necessary to swing the needle around until it bisects the quarter-corner on the north line of section 11, since this is parallel to the line desired, the course and distance being the same. The course or direction can be read from the graduated dial or degree-circle at the point of the needle, while the distance in miles and fractions thereof is indicated by the graduations on the needle between the two points. To read the graduations on the needle to less than tenths of a mile, a magnifying glass may be used.

The sectional sight arms 16 and 18, are pivoted to the opposite sides of the compass-box 2 by hinges 20 and 21, respectively, secured to a metal strap 22, which passes under the box, as shown in Fig. 6, and thus relieves it of any strains which would tend to distort it. The hinges are preferably stiff, so that they will remain in any adjusted position. Each sight arm is composed of two sections connected by a central rule-joint 26. The front sight arm 16 is slotted longitudinally, and is provided with a central sight-line or hair 23, and with top and bottom cross-hairs 24, 25, in alinement with the sight openings in the rear sight arm. The rear sight arm 18 is provided with a narrow longitudinal slit 27, terminating at either end in restricted sight openings 27$^a$, 27$^b$.

For the purpose of adapting this instrument for use as a hypsometer to ascertain the height of trees or other objects located on unlevel ground, I graduate the front sight arm 16, upon the front face, into feet and log lengths, measured at a distance of 100 feet from the object. Inasmuch as it is necessary to measure the heights of objects both above and below a level horizontal line, I number one side of the face from the bottom upwardly and the other side from the top downwardly.

To adapt the instrument for use as a clinometer to measure angles of elevation or depression, I graduate the side edges of the front sight arm into degrees, the opposite edges being marked reversely to enable angles to be read either upwardly or downwardly from a horizontal.

In using this instrument to project a line on a predetermined grade, as in the case of trail and road surveys, as well as for the purpose of accurately determining the usable lengths of trees in standard sixteen foot lengths, or in determining the total height of a tree in feet on reconnaissance work and similar studies, it is desirable to mark definitely and accurately the precise point of the line of sight upon the hair line of the front sight. I, therefore, provide a cross-hair slide-frame 28, which is movable along the sight arm and is held in any adjusted position by the springs 29. The frame carries a cross-hair 31, across the front, and hairs 32 upon opposite sides.

When it is desired to sight either up or down steep hill angles, the sight arms may be swung about the hinges to any desired extent above or below the horizontal plane, as indicated in Fig. 8. When the arms are extended horizontally in opposite directions and the upper sections are then swung upwardly at the joints, the sights are thereby separated to double the normal distance, thus securing a more reliable base for accurately projecting long lines. For the purpose of introducing compensating angles, so that the height of a tree or other object may be read directly from an elevation, just as though the instrument was horizontal with the base of the tree, I secure a graduated circular plate 35 to the lower end of the sight arm 16, which moves therewith and is concentric with the axis of the hinge to which is secured a pointer 36. The front sight arm may then be inclined at the proper compensating angle. The circular plate is divided into degrees, and if desired, the corresponding compensating angles may also be indicated thereon.

In order that the ring 2', carrying the degree-circle, may be angularly adjusted with respect to the base plate 2, as when it is desired to follow a magnetic variation upon a resurvey of a survey taken some years before, the sides of the base 2 and ring 2' are provided with a vernier, as indicated at 40.

While I have described in detail the apparatus shown in the drawings for the purpose of illustrating an embodiment of my invention, I am aware that changes may be made therein without departing from the spirit of my invention, and it is my purpose to include such modifications within the scope of my claims. I have described the diagram inscribed upon the base-plate as adapted for use in connection with the usual township divisions in this country, but it is evident that appropriate diagrams may be substituted therefor to adapt the instrument for use in any country.

I claim:—

1. An engineering instrument comprising a compass provided with a graduated degree-circle and a pivoted magnetic needle coöperating therewith, and a base plate having a rectangular diagram inscribed within said circle and divided into a number of rectangular subdivisions.

2. An engineering instrument comprising a compass provided with a graduated degree-circle and a pivoted magnetic needle coöperating therewith, and a base plate having a rectangular diagram inscribed within said circle and divided into a number of rectangular subdivisions, said needle having a longitudinal edge in alinement with the pivot and the pointer thereof.

3. An engineering instrument comprising a compass provided with a graduated degree-circle and a pivoted magnetic needle coöperating therewith, and a base plate having a rectangular diagram inscribed within said circle and divided into a number of rectangular subdivisions, said needle having the alternate longitudinal edges upon opposite sides of the pivot in alinement with the pointers and the pivot.

4. An engineering instrument comprising a compass provided with a graduated degree-circle and coöperating pivoted magnetic needle, sight arms hinged to opposite sides of said compass, one of said arms being graduated and having a movable slide-frame carrying cross-hairs adapted to register with the graduations.

5. An engineering instrument comprising a compass provided with a graduated degree-circle and coöperating pivoted magnetic needle, sight arms hinged to opposite sides of said compass, one of said arms having reversely arranged sets of graduations and a centrally disposed sight line or hair, and a slide-frame movable along said graduated arm and carrying cross-hairs adapted to register with the graduations.

6. An engineering instrument comprising a compass provided with a graduated degree-circle and coöperating pivoted magnetic needle, sight arms hinged to opposite sides of said compass, one of said arms carrying at its base a graduated plate concentric with the hinge.

7. An engineering instrument comprising a compass box provided with a graduated degree-circle and a pivoted magnetic needle coöperating therewith, a supporting-strap or plate secured to said box and passing thereunder and having its ends projecting above the box upon either side, and sighting arms pivotally secured to said ends.

8. An engineering instrument comprising a compass provided with a graduated degree circle, a base plate having a rectangular diagram inscribed within said circle and divided into a number of rectangular subdivisions, and a pivoted magnetic needle having its upper surface graduated to coöperate with said diagram in reading distances and the ends of the needle coöperating with the degree circle in reading angles thereon.

In testimony whereof I have hereunto set my hand in presence of two subscribing witnesses.

DANIEL W. ADAMS.

Witnesses:
PHILANDER C. JOHNSON,
WILLIAM SCHERER.

---

Copies of this patent may be obtained for five cents each, by addressing the "Commissioner of Patents, Washington, D. C."